United States Patent [19]

Jaubert

[11] Patent Number: 4,752,989

[45] Date of Patent: Jun. 28, 1988

[54] FASTENING DEVICE FOR SPLICING BELTS, SPLICING PROCESS USING SAID DEVICE, AND BELT SPLICED ACCORDING TO SAID PROCESS

[76] Inventor: Claude Jaubert, 18, rue de la Meulonniere, 92500 Rueil Malmaison, France

[21] Appl. No.: 924,889

[22] Filed: Oct. 30, 1986

[30] Foreign Application Priority Data

Oct. 30, 1985 [FR] France ............................... 85 16104

[51] Int. Cl.⁴ .............................................. F16G 3/08
[52] U.S. Cl. .......................................... 24/38; 24/37; 474/257
[58] Field of Search .................... 24/38, 37, 36, 33, 35, 24/39; 474/257, 264

[56] References Cited

U.S. PATENT DOCUMENTS

| | | |
|---|---|---|
| 173,686 | 2/1876 | Starr . |
| 1,803,354 | 5/1931 | Purple ................................. 24/37 |
| 1,918,257 | 7/1933 | Forsyth ................................ 24/37 |
| 2,330,434 | 9/1943 | Lazzell ................................. 24/37 |
| 2,330,435 | 9/1943 | Lazzell ................................. 24/37 |
| 2,446,311 | 8/1948 | Traxler ................................ 24/37 |
| 2,477,855 | 8/1949 | Beach .................................. 24/37 |
| 2,852,826 | 9/1958 | Carlson . |
| 3,093,005 | 6/1963 | Dean ................................... 24/37 |
| 3,105,390 | 10/1963 | Funke et al. ......................... 474/257 |
| 3,618,384 | 11/1971 | Bierlein ............................... 474/257 |
| 4,489,827 | 12/1984 | Anderson ............................. 24/37 |
| 4,540,389 | 9/1985 | Ramsey ............................... 474/257 |

FOREIGN PATENT DOCUMENTS

| | | |
|---|---|---|
| 907996 | 4/1954 | Fed. Rep. of Germany . |
| 1165354 | 10/1964 | Fed. Rep. of Germany . |
| 2341992 | 3/1975 | Fed. Rep. of Germany . |
| 2519333 | 11/1976 | Fed. Rep. of Germany . |
| 2813130 | 9/1979 | Fed. Rep. of Germany . |
| 413355 | 8/1910 | France . |
| 928836 | 4/1966 | France . |
| 1395634 | 6/1966 | France . |
| 1582190 | 9/1969 | France . |
| 2404153 | 4/1979 | France . |

OTHER PUBLICATIONS

Deutsche Normen; Feb. 1965.
A Survey on Present-Day Conveyor Belt Technology; H. P. Lachmann, Germany, Dec. 1984.
Conveyor Belt-Some Trends in Construction and Joining; Geoff Pearse; Aug. 1984.

Primary Examiner—Victor N. Sakran
Attorney, Agent, or Firm—Antonelli, Terry & Wands

[57] ABSTRACT

Fastening device for splicing belts comprising reinforcing elements made of manmade fabric or metal cords, characterized by the fact that it consists of two central support plates, two installation and alignment wedges, two locking cores which make it possible to create loops in the ends of the belt(s), and two lateral clamping plates each equipped with a ball joint, these various component elements making it possible for said device to operate in a self-clamping pivoting manner. Applicable to straps and belts and, more particularly, to conveyor belts for elevators.

7 Claims, 7 Drawing Sheets

FIG_3

FIG_4a

FIG_4b

FIG_4c

FIG_4d

FIG_4e

FIG_8a

FIG_8b

FASTENING DEVICE FOR SPLICING BELTS, SPLICING PROCESS USING SAID DEVICE, AND BELT SPLICED ACCORDING TO SAID PROCESS

BACKGROUND OF THE INVENTION

This application is related to U.S. application Ser. No. 924,775 and 924,639.

The invention concerns belts or straps, more particularly elevator conveyor belts. It relates to a method and a device for splicing the ends of belts, either to increase their length, or to make them endless by joining the belt to itself in a manner which is reliable during operation. The fastening device as well as the process will be described below, as an example, for application to an elevator belt, with the understanding that they are not limited to this use.

One conventional method of splicing the ends of belts is hot splicing after the ends of the reinforcing material have been interlaced.

Various forms of these hot splicing techniques are described in a number of patents, such as DE No. 1,165,354 of Franz Clouth Rheinische Gummiwarenfabrik; FR No. 74.03141 and DE No. 907,996 of Continental Gummi-Werke; FR No. 1,395,634, FR No. 1,582,190 and FR No. 1,440,605 of Pneumatiques, Caoutchouc Manufacture et Plastiques Kleber Colombes; and U.S. Pat. No. 173,686 of Goodyear Tire and Rubber. One method is recommended in German standard DIN 22131. Another method is described by Mr. Gozdiff of Goodyear in a paper entitled "Factors relating to vulcanized splice reliability for steel cable reinforced conveyor belting", delivered to the 125th Meeting of the Rubber Division, American Chemical Society, in Indianapolis on May 8-11, 1984. Finally, an article by H. P. Lachmann entitled "A survey of present-day conveyor belt technology", published in *Bulk Solids Handling* volume 4, number 4, December 1984, reviews the different technologies that can be used. Other proposals have been described in, for example, U.S. Pat. Nos. 2,446,311 and 3,093,005.

Examples of the prior art in hot splicing are illustrated in FIG. 1. There are, however, conditions which make hot splicing techniques inapplicable: for example the length of such a splice may be incompatible with the space available in the sheath or alongside the elevator, or again the mechanical strength may become insufficient to guarantee trouble-free operation of the elevator if the temperature of the products transported or that of the gases circulating in the sheath is greater than 100° C.

Specifically, in the case of interlacing of metal cords, the two ends of the belt(s) are bonded together by the rubber mixture separating the ends of the cable(s). It is known, however, that as the temperature increases, the mechanical properties of elastomer-based mixtures decrease; the same applies to the bonding forces between the rubber and the metal. As a consequence, the tensile strength of such a splice decreases as the temperature rises.

Taking into account the risks encountered with a splice using hot adhesion and interlacing of metal cords, handling engineers have suggested replacing the adhesive bond with a mechanical bond designed to clamp the two ends of the belts(s) against one another. These techniques are referred to as "fastening", and are described, for example, in French Pat. No. 1,320,222 of Pneumatiques, Caoutchouc Manufacturé et Plastiques Kléber Colombes, or in advertising materials of specialized companies such as Goro or Flexco.

Other mechanical fasteners are described in, for example, U.S. Pat. Nos. 2,447,855 and 1,918,255.

The compression force is exerted by metal flanges which are passed through by clamping bolts. The principle applied in mechanically splicing the ends of a belt or belts is theoretically more satisfactory than the hot-adhesion process, but an analysis of phenomena associated with operation of this type of device shows that there is only a slight improvement in operating reliability. This is because the lateral plates have a tendency to move away from one another under the tensile force exerted on the two ends of the belt. To remedy this problem, two lines of bolts are generally used to clamp the plates, with the line of bolts placed closest to the tension zone being designed to limit movement of the plates.

Figure 1A:
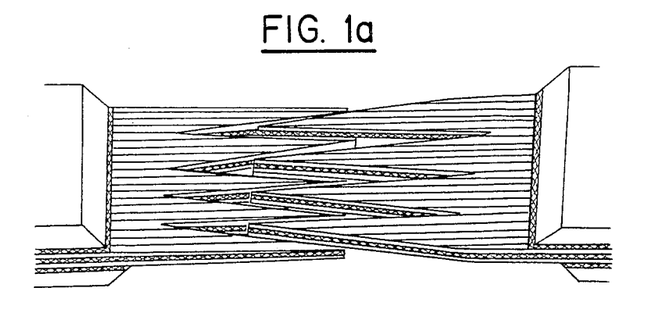
FIGS. 1 and 2 illustrate fastening devices constructed in accordance with the prior art.
Figure 1B:
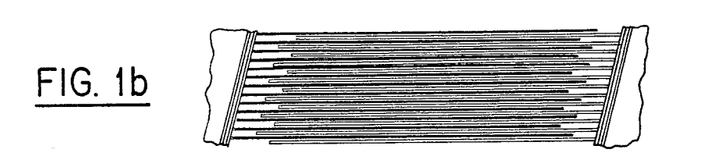
Figure 1C:
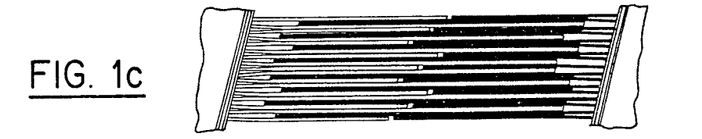
Figure 1D:
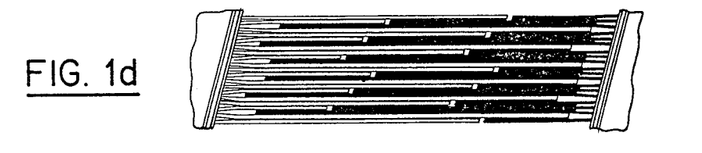
Figure 2:
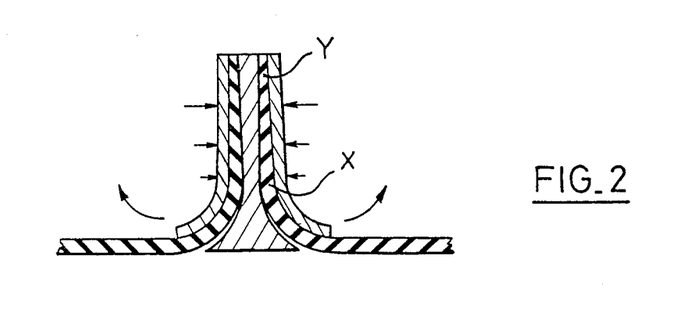

FIG. 2 illustrates conventional fastening techniques such as described in U.S. Pat. Nos. 4,489,827, 1,803,354, 2,330,434, 2,330,435, 3,618,384, and 4,450,389 and provide an example of changes which occur during operation, in terms of distribution of pressure over the belt ends.

When the fastening device is initially clamped, pressure distributed uniformly over the entire extent of the two clamped ends. When operation begins, the lateral parts are displaced, which tends to decrease the pressure in zone X and increase that in zone Y. As a result of the increased pressure, the rubber mixture located in zone Y tends to be expelled and to creep, i.e. rubber is displaced from the most highly compressed zones towards those least compressed. The effect of this creep is to encourage the clamping plates to move closer together in zone Y, which accentuates the effect.

As confirmation of this analysis, it is commonly observed that the second line of bolts has completely loosened, which proves that the pressure effect exerted on the ends of the belt(s) is due not to the bolts but to a rotary movement of the clamping plates. Since the clamping force in zone X has decreased considerably, the strength of such a clip fastener consists only of the retention of the metal cords in zone Y and the frictional forces existing in zone X between the belt and each of the clamping plates. When zone Y is unclamped, an examination of the ends of the belt(s) in said zone shows that the tensile stress has been so high that there has been local destruction of the rubber mixture and of the bond between the rubber and the metal cords. This fact makes the strength of such a clip fastener very problematical, especially when this mechanical effect is combined with the effect of temperature, since it is well known that increased temperature accelerates and facilitates the creep of elastomer-based mixtures, and decreases the strength of the bond between said mixtures and steel cords.

To remedy this problem, it is possible to attempt to increase the pressure exerted by the lateral plates by locking the ends of the metal cords.

Patent DE No. 2,341,992 of Bernhard Beumer Maschinenfabrik describes such a solution, in which each metal cord is stripped at its end of its rubber covering, and said end is inserted into a clamping device using screws. Such a technique, time-consuming and difficult to implement, presents a further risk due to the design of the metal cord clamping zone: if the clamping pressure is not properly controlled, there is a definite risk of cutting the metal cord, which would nullify the anticipated effect. In addition, the screws have a tendency to loosen under the action of vibration and temperature, and therefore require constant monitoring.

A similar solution of the type described above using bores steel balls to lock the ends of metallic cables is also proposed in U.S. Pat. No. 3,105,390.

A different solution, used in particular to lock pretensioning cords in prestressed structures, involves stripping the ends of the metal cords, unstranding them, i.e. untwisting the constituent strands to spread out the end, and pouring around it a metal with a low melting point. This technique is highly reliable when it can be used, but pouring the molten metal requires that the clip fastener be placed in a vertical position, which implies either that one of the drums of the elevator can be moved - which is not always possible—or that the clip fastener can be placed at the top of the elevator, although pouring molten metal onto the ends of metal cords at a height of several dozen meters is tricky and even dangerous. In addition, such a device is practically non-removable, which does not facilitate maintenance of the elevator or replacement of the belt.

The object of the invention is therefore a fastening device for splicing belts, and more particularly belts for bucket elevators, which comprises a reinforcement made of manmade fabric or metal cords. Other objects of the invention are the process for creating splices using the device described, and application to an elevator conveyor belt.

The fastening device which is the object of the invention makes it possible to create, using a method that is as simple as conventional splices and is completely safe since there is no handling of hot products or adhesives or heating equipment, a splice between two adjacent ends of two belts to produce a longer belt, or between the two ends of a single belt to produce an "endless" item, ready for operation on a conveyor or elevator.

The device, which requires only simple preparation of the ends, acts on the one hand by locking by means of a loop created around a locking core, and on the other hand by means of mechanical clamping of said ends over the greatest possible length.

This fastening device comprises, on the one hand, two central plates, designed solely for installation and serving to support the ends of the belts(s), to which are attached, on the upper part, two installation wedges allowing the assembly to be aligned, and on the other hand, two locking cores making it possible to create loops in the ends of the belt(s) and, finally, two lateral clamping parts each fitted with a ball joint.

This device acts like a pivoting self-clamping clip by means of its various component parts, with the lateral clamping parts acting to clamp the belt by means of through bolts.

The characteristics and variants of the invention will be better understood by reading the description below taken in conjunction with the accompanying.

DETAILED DESCRIPTION

Figure 3:
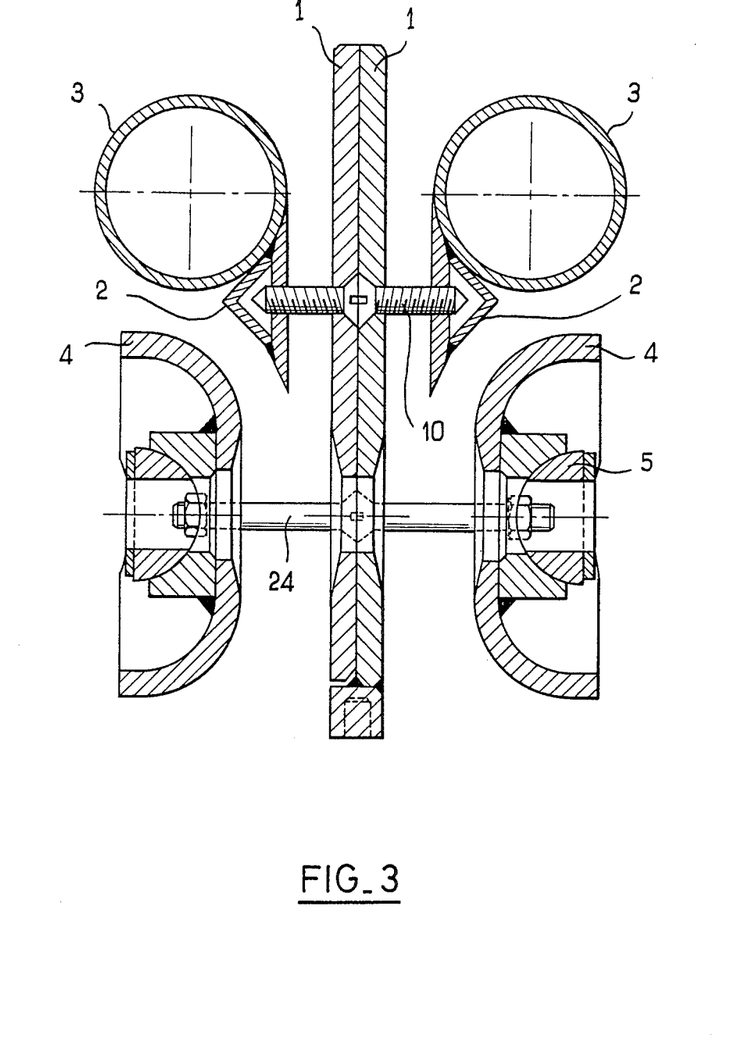
FIG. 3 shows the fastening device used for splicing two belts or making one belt into an endless belt.

Referring now to the drawings wherein like reference numerals are used throughout the various views to designate like parts and, more particularly, to FIG. 3, according to this figure, a fastening device, in an assembly position, includes two central support plates 1 to which are mechanicaly attached, by attaching means 10, two wedges 2 for installing and aligning a belt. The fastening device also includes two locking cores 3 of a generally cylindrical cross section and two lateral clamping parts provided with a ball joint 5. While the component parts of the fastening device can be made of steel thereby leading to a total weight for the fastener of approximately 80 kg per meter of length.

Considerable lightening can be achieved by making locking cores 3 and central support plates 1 of a lower-density material, such as duralumin, a composite material with a rigid matrix, or a rubber-based mixture reinforced wtih fabric or metal fillers or fibers. In the case where duralumin is used, the weight of the fastener is decreased to approximately 59 kg per meter of length, which increases the advantage of this type of fastening in terms of the conveyor's energy budget.

Figure 4A:
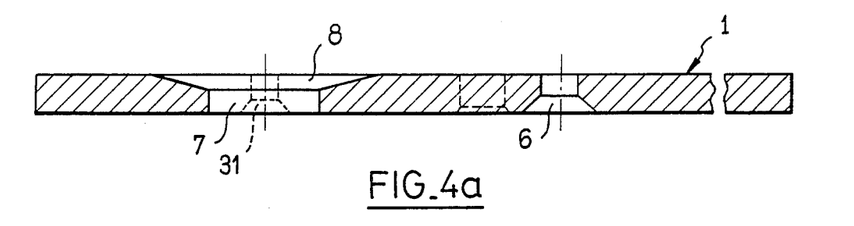
FIGS. 4a–4e show details of certain component elements of a particular embodiment of the fastening device.

FIG. 4a shows one of the central plates 1 with, in its upper part, a hole 6 for mechanical attachment of the installation and alignment wedges and, in its lower part, a hole 7 for passage of the through bolts with a recess 8 which will allow the rubber covering to expand in the vicinity of the zone where the through bolts clamp and, along the same axis, a hole 31 to retain the loop before clamping.

Figure 4B:
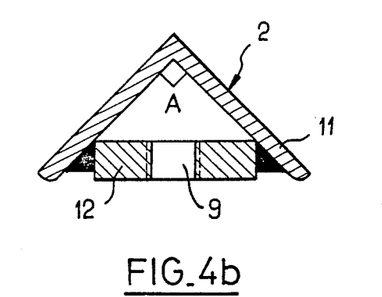

FIG. 4b shows one of the possible shapes for the installation and alignment wedges 2, comprising a hole 9 which will allow the belt to be attached between edge 2 and central support plate 1. The holes 6 in said plate 1 and 9 in the installation and alignment wedge 2 will accommodate the assembly device 10 in FIG. 3.

In the example illustrated, installation and alignment wedge 2 consists of an L-shaped part 11 in which angle A is 90°, and a welded base element 12 with a tapped hole 9 for attachment to central support plate 1.

Figure 4C:
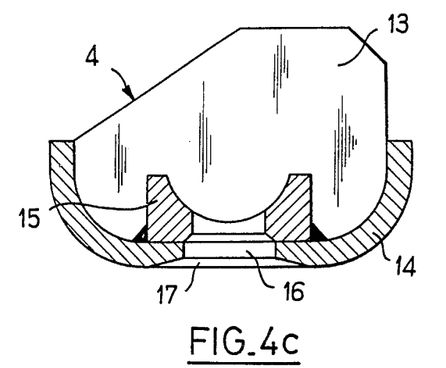

FIG. 4c illustrates, in cross section, a particular embodiment of one of the lateral clamping parts 4, composed of a stiffener 13 and a clamping distribution sheet 14 to which is attached, by welding, the ball-joint support 15. Lateral clamping part 4 comprises a hole 16 through which the through bolts pass, and a recess 17 to allow the rubber covering to expand in the vicinity of the zone where the transverse bolt clamps.

Figure 4D:
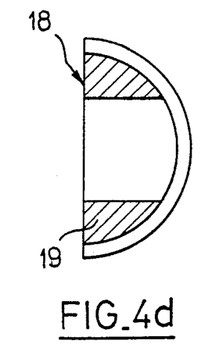
Figure 4E:
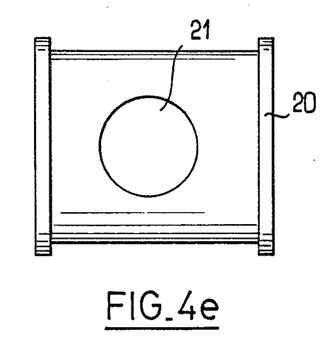

FIG. 4d and 4e illustrate, in cross section, the ball-joint device 18 which will be inserted into ball-joint support 15 on lateral clamping part 4. It consists of a half-cylinder 19 comprising two lateral positioning shoulders 20, and through it passes a hole 21 for the through bolts.

Figure 5:
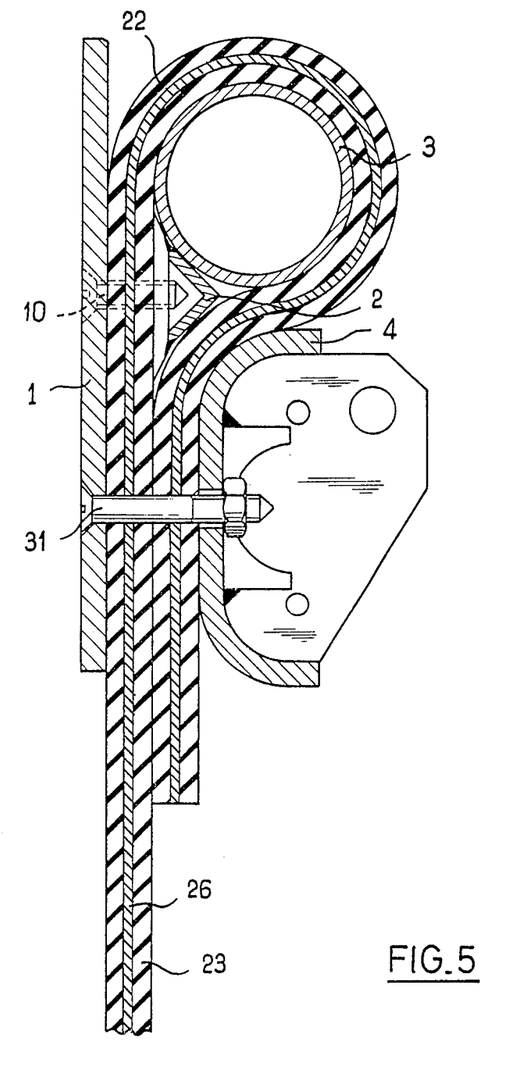
FIG. 5 explains how the belt is installed on the fastening device.

FIG. 5 illustrates the way in which the fastening device is installed on a belt end, as a unit, within the conveyor or outside it.

The process begins with creation of the loop. To do this, end 22 of belt 23 being assembled is placed against central plate 1, and installation and alignment wedge 2 is attached by means of mechanical elements 10 to said central plate through end 22 of the belt. Locking core 3 is then placed against installation wedge 2 and the loop is formed around said locking core using a forming tool. Clamping part 4 is put into place and retained with clamps on central part 1, then attached with installation nuts and bolts 31.

Figure 6:
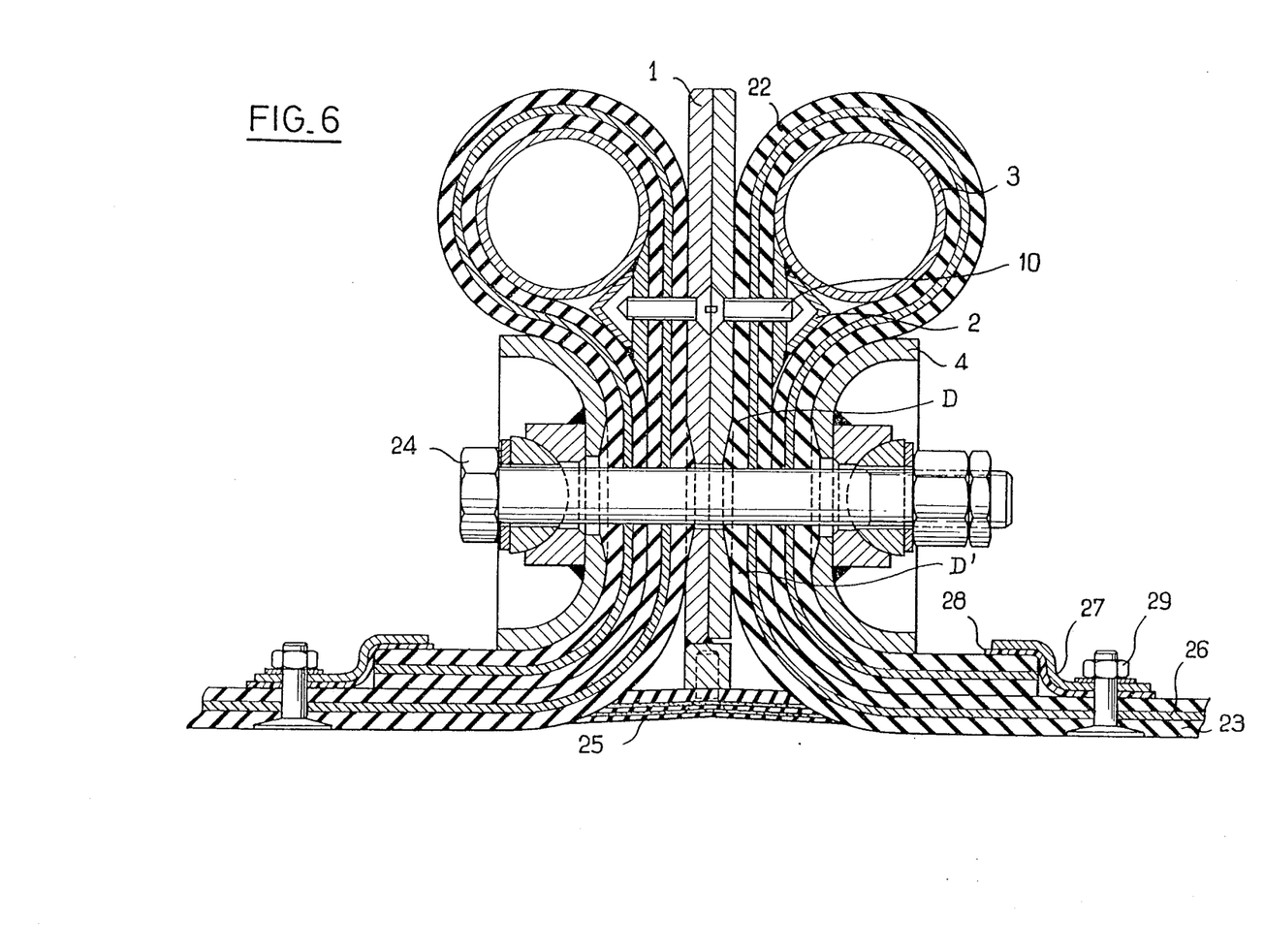
FIG. 6 illustrates the splicing process using the fastening device which is the object of the invention.

FIG. 6 illustrates the belt splicing process using the fastening device which is the object of the invention. After the loops have been formed, resting against central pars 1, the two parts are placed back to back and mechanically clamped with through bolts 24. The expansion of the rubber coatings produced when through bolts 24 are inserted into the belt is accommodated by recesses 8 in central support plates 1 and 17 in lateral clamping plates 4. An elastic welt 25, made of rubber comprising fabric or metal reinforcements, is added to the fastening device to allow it to pass over rollers and drums without impact and, moreover, without noise.

In order for ends 22 of the belt(s) being assembled to be wound without excessive stress around locking cores 3, said cores must have a sufficiently large diameter. The minimum value is not critical with a textile-reinforced belt which is fairly flexible, but for a belt whose reinforcement consists of metal cords, the diameter of said locking cores 3 must be at least 16 times the diameter of the metal cords, and preferably 20 times.

To prevent dust contamination or chemical attack, it is possible to finish off the splice by applying a terminal welt 27 placed on a sheet of insulating material 28, for example a cellular material, and affixed to the belt with a mechanical clamping device 29.

To extend this protection against contamination to the entire spliced zone, it is possible to place on the upper part of the device a cap (not shown), most often made of sheet metal, and to ensure complete watertightness by applying a putty or any other formable material.

In order to increase the mechanical strength and therefore the efficacy of the splice by limiting the number of breaks in the reinforcing elements in the zone where the bolts pass through, it is possible, during installation, to arrange said reinforcing elements 26 in such a way that they are diverted from their initial path around the shafts of said bolts 24 as diagrammed in FIG. 7. This is done with a suitable tool, for example one with a tapered point.

Figure 7A:
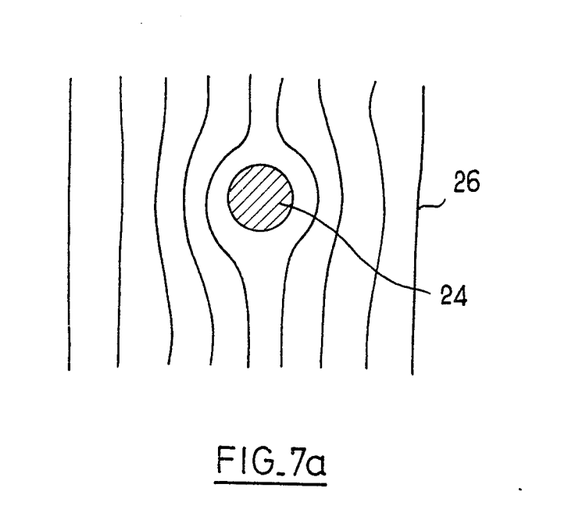
FIGS. 7a–7b show a particular arrangement making it possible to improve the quality of the splice.

FIG. 7a illustrates how the reinforcing elements are diverted when said reinforcement consists of textile or metal cords 26, initially parallel, forming a ply.

Figure 7B:
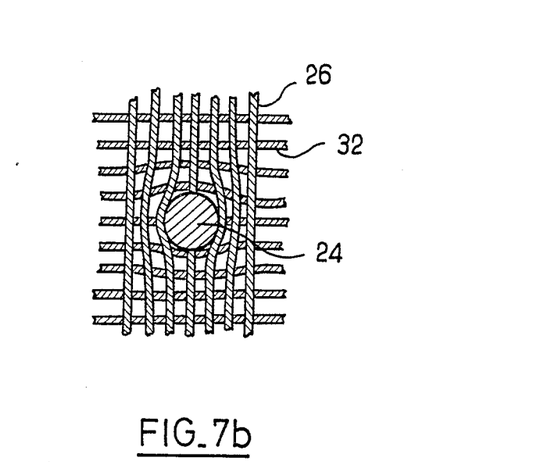

FIG. 7b shows the same effect in a reinforcing element comprising a weft 26 composed of textile or of metal cords, and a warp 32 also composed of textile or of metal cords. The threads are then diverted longitudinally along weft 26 and transversely along warp 32.

FIG. 8 illustrates the principle and the operation of the self-clamping system.

Figures 8A, 8B:
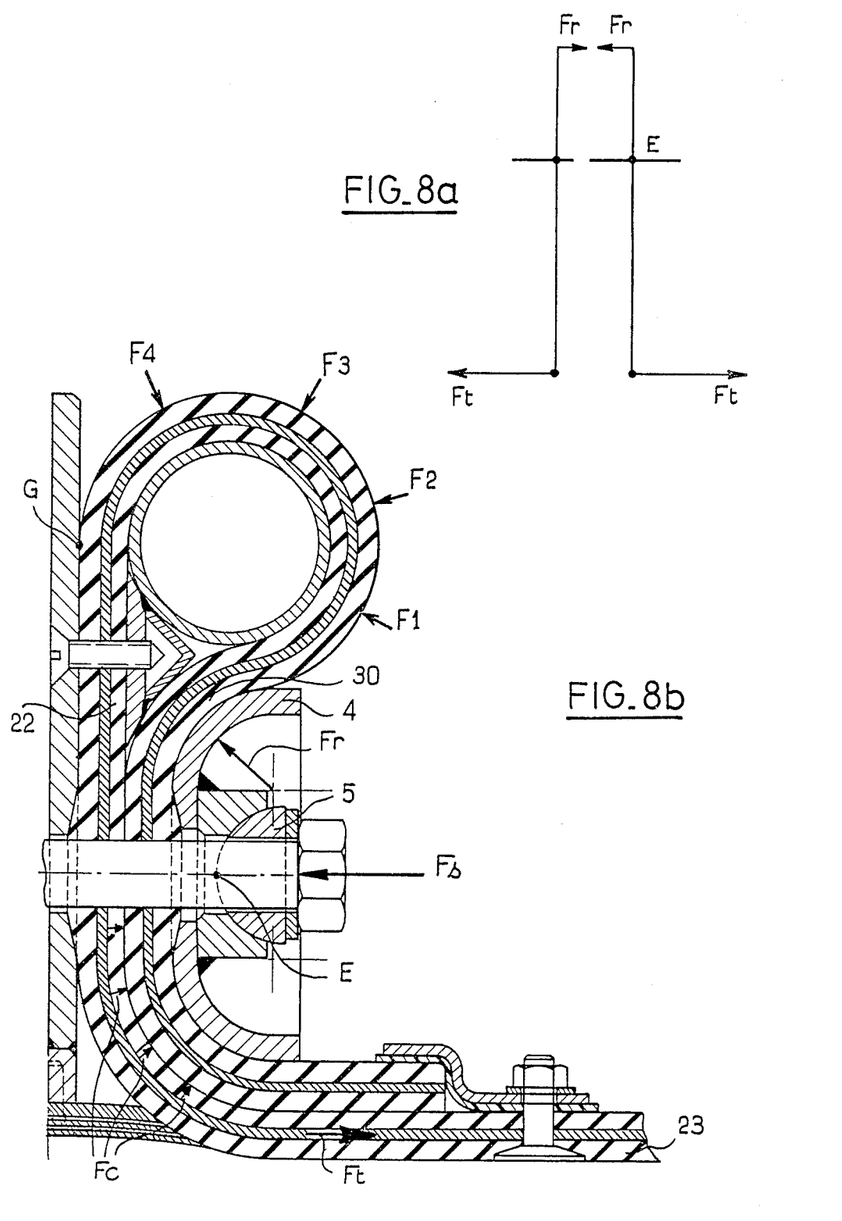
FIGS. 8a–8b illustrate the self-clamping operating principle of the fastening device which is the object of the invention.

FIG. 8a shows the orientation of the forces. The tensile force Ft which acts on the body of the belt gives rise to a reaction force Fr in relation to point E.

FIG. 8b illustrates the same effect on a cutaway view of the fastener. The tensile force Ft which acts on the body of the belt 23 produces a compression represented by forces Fc in the end of belt 22 which tend to press together the two parts of the belt thanks to its ball-joint device 5; lateral clamping part 4, by pivoting about point E, then exerts a reaction force Fr on the return side of the loop in belt 30, which gives rise to a series of forces f1, f2, f3 ... which progressively increase up to point G where the end of the belt is supported on central plate 1, thereby producing self-clamping of the end of the belt around locking core 3.

Obviously, clamping force Fs of the transverse bolt must be greater than the sum of tensile force Ft and reaction force Fr.

As apparent from the above description and attached figures, the fastening device of the present invention has a number of advantages as compared with prior art devices. More particularly, the fastening device of the present invention is applicable both to textile-reinforced belts and to those belts in which the reinforcement consists of metal cords. Moreover, there is no need to prepare the end of the belt and it can be applied flat, off the conveyor, without requiring any complex tool. Furthermore, a number of cut reinforcing elements can be reduced which thereby increase the strength of the splice, and the process of gluing the ends of the belt is eliminated thereby also dispensing with the requirement for additional equipment such as, for example, vulcanization presses, molding parts of build-up devices.

Additionally, by virtue of the features of the present invention, the fastening device may be reduced in weight by making the locking cores and/or the central parts out of a like metal or composite materials thereby reducing the overall energy cost per unit, and maintenance problems during operation may be reduced since possible creep of the rubber into the clamping zones is compensated for by a pivoting of the lateral clamping parts.

Furthermore, the present invention enables an increase in reliability due to the self clamping effect exerted by the ball-joint device in the lateral clamping parts.

I claim:

1. Fastening device for splicing belts for bucket elevators, the belt comprising rubber coverings and a reinforcing element made of one of a man made fabric or of metal cords, the fastening device comprising two central support plates, two installation and alignment wedges, two lateral clamping plates each including a ball joint, and two locking cores which make it possible to create loops in the ends of the belt said locking cores being made of one of a light metal material or plastic composite with a rigid matrix and having a strength high enough to withstand tensioning forces developed under operation of the belt, these various components making it possible for said fastening device to operate in a self-clamping pivoting manner.

2. Fastening device for splicing belts, according to claim 1, characterized by the fact that, for use with belts reinforced with longitudinal metal cords, the radius of curvature of locking cores is equal to at least eight times the diameter of said metal cords.

3. Fastening device for splicing belts, according to one of claims 1 or 2, characterized by the fact that locking cores are made of a rubber-based mixture reinforced with textile or metal fillers or fibers to avoid damage to belt ends when they are wedged onto central plates and lateral plates.

4. Fastening device for splicing belts, according to claim 1, characterized by the fact that a cap for protection against contamination and the weather is attached to the upper part of said device and made watertight by the use of a putty.

5. Process for splicing belts by fastening, characterized by the fact that the ends of the belts, not stripped of a rubber covering, are clamped, after formation of a loop around locking cores, by means of through bolts, between central support plates and lateral clamping plates of the fastening device according to claim 1.

6. Process for splicing belts by fastening, according to claim 5, characterized by the fact that longitudinal and-/or transverse reinforcing elements of the belts are diverted from their initial paths in the vicinity of through bolts which act to attach the component elements of the fastening device to the belt.

7. Conveyor belt for bucket elevator, spliced or made into an endless belt using the fastening device according to claim 1.

* * * * *